(12) United States Patent
Song et al.

(10) Patent No.: US 7,665,138 B2
(45) Date of Patent: Feb. 16, 2010

(54) DETECTING METHOD AND ARCHITECTURE THEREOF FOR MALICIOUS CODES

(75) Inventors: Chen-Hwa Song, Taipei (TW); Ying-Yuan Huang, Alian Township, Kaohsiung County (TW)

(73) Assignee: Industrial Technology Research Institute, Hsinchu (TW)

( * ) Notice: Subject to any disclaimer, the term of this patent is extended or adjusted under 35 U.S.C. 154(b) by 933 days.

(21) Appl. No.: 11/166,691

(22) Filed: Jun. 26, 2005

(65) Prior Publication Data

US 2006/0143707 A1 Jun. 29, 2006

(30) Foreign Application Priority Data

Dec. 27, 2004 (TW) .............................. 93140737 A

(51) Int. Cl.
G06F 21/00 (2006.01)
(52) U.S. Cl. .............................. 726/24; 726/22; 726/23; 726/25
(58) Field of Classification Search .............. 726/22–25
See application file for complete search history.

(56) References Cited

U.S. PATENT DOCUMENTS

| | | | | |
|---|---|---|---|---|
| 4,001,819 | A | | 1/1977 | Wise .......................... 340/420 |
| 5,163,088 | A | | 11/1992 | LoCascio ..................... 379/95 |
| 5,359,659 | A | | 10/1994 | Rosenthal ....................... 380/4 |
| 5,398,196 | A | * | 3/1995 | Chambers ..................... 714/28 |
| 5,414,833 | A | | 5/1995 | Hershey et al. .............. 395/575 |
| 5,684,875 | A | | 11/1997 | Ellenberger ..................... 380/4 |
| 5,940,002 | A | | 8/1999 | Finn et al. .............. 340/825.31 |
| 5,960,177 | A | | 9/1999 | Tanno .................... 395/200.59 |
| 6,108,799 | A | * | 8/2000 | Boulay et al. ................. 714/38 |
| 6,205,115 | B1 | | 3/2001 | Ikebe et al. .................. 369/291 |
| 6,237,036 | B1 | | 5/2001 | Ueno et al. .................. 709/225 |
| 6,594,780 | B1 | | 7/2003 | Shen et al. ..................... 714/15 |
| 6,732,279 | B2 | | 5/2004 | Hoffman ..................... 713/201 |
| 6,757,822 | B1 | | 6/2004 | Feiertag et al. ............. 713/152 |

(Continued)

FOREIGN PATENT DOCUMENTS

TW 477140 2/2002

(Continued)

OTHER PUBLICATIONS

"Fork (operating system)"—Wikipedia, the free encyclopedia; Feb. 27, 2005; pp. 1-3; "http://en.wikipedia.org/w/index.php?title=Fork_(operating_system)&oldid=10609259".*

(Continued)

*Primary Examiner*—Carl Colin

(57) ABSTRACT

A detecting method and architecture thereof for malicious codes is provided, which is applicable to a computer system having at least a host. Each host executes at least a process. The method is implemented with a system call interposition module and an analysis module for malicious codes. The system call module intercepts all system calls of process calls and all related arguments of the system calls. The analysis module for malicious codes analyzes the input data of pre-determined system calls, and executes the suspicious malicious codes. Once the same behaviors between the analysis module and the suspicious malicious codes are found, a system-intrusion warning is immediately triggered. The method is not required to maintain huge signature databases, and can detect unknown attack-skills in a manner of high correct rate and low incorrect ruling.

19 Claims, 8 Drawing Sheets

U.S. PATENT DOCUMENTS

| | | | |
|---|---|---|---|
| 6,775,780 B1 * | 8/2004 | Muttik | 726/24 |
| 6,779,117 B1 | 8/2004 | Wells | 713/200 |
| 7,093,239 B1 * | 8/2006 | van der Made | 717/135 |
| 7,181,768 B1 * | 2/2007 | Ghosh et al. | 726/23 |
| 7,225,204 B2 * | 5/2007 | Manley et al. | 707/200 |
| 7,370,360 B2 * | 5/2008 | van der Made | 726/24 |
| 2005/0193428 A1 * | 9/2005 | Ring et al. | 726/22 |
| 2006/0031673 A1 * | 2/2006 | Beck et al. | 713/164 |

FOREIGN PATENT DOCUMENTS

| | | |
|---|---|---|
| TW | 574655 | 2/2004 |

OTHER PUBLICATIONS

"YoLinux Tutorial: Fork, Exec and Process control"; copyright 2004, 2005 by Greg Ippolito; pp. 1-19; "http://www.yolinux.com/TUTORIALS/ForkExecProcesses.html".*

* cited by examiner

DETECTING METHOD AND ARCHITECTURE THEREOF FOR MALICIOUS CODES

FIELD OF THE INVENTION

The present invention generally relates to network security, and more specifically to a detecting method and architecture thereof for malicious codes by using a system call analysis mechanism.

BACKGROUND OF THE INVENTION

As the information technology progresses rapidly and the Internet becomes ubiquitous, the daily life pattern of the society changes. Although the information technology has brought much convenience, the related security problem has also arisen to an alarming level. The recent attacks on the network security vulnerability have caused much to the society. The network security is one of the most prominent issues in modern society.

Although most organizations and institutes have Internet firewall in place, the firewall installation itself is insufficient to assure the network security. When the web pages are replaced or any internal host is implanted with a backdoor program, the firewall can be bypassed and the security is compromised. In the development of network security, the multi-layer security defense mechanism includes a second layer defense mechanism, namely, intrusion detection system (IDS), which is gaining popularity.

However, the detection function of the conventional IDS is based on the intrusion rule and signature information, instead of the behavior. Therefore, the detection of intrusion is limited to the pre-defined system events. The major drawback of this type of detection mechanism is that the malicious codes, which refer to machine codes entering software system to execute unauthorized operations, may come as an unforeseeable combination.

FIG. 1 shows a schematic view of a conventional memory structure. The well-known buffer overflow is used to explain the operation of a malicious code. The buffer overflow includes stack overflow and heap overflow. As shown in FIG. 1, a memory 10 at least includes three segments, namely, a code segment 11, a data segment 12, and a heap segment 13. When a program copies data to the local variable, it does not check the range limitation of the buffer so that data segment 12 or heap segment 13 of the buffer will be overflown with the data originated from the malicious code, which leads to a segment fault. After that, the intruder can modify an instruction pointer 14, or use a return address to change the flow of the program, or execute the attack assigned by the malicious code.

Because the malicious code is written by the intruder, the intruder can modify or write different code to suit the purpose of the attack; therefore, the attack can have a different signature so that a pre-defined signature analysis may mistake and miss the attack. In addition, the ubiquity of Internet has caused the widespread of the malicious codes, this further exposes the drawbacks of the pre-defined signature analysis approach.

The conventional IDS relies on the specific and known data, known as signature, to identify if an attack has occurred. As the technique and the types of attack are increasingly evolving, the conventional signature database faces the problem of size explosion, and is yet insufficient to contain the necessary information.

It is therefore necessary to provide a detection method and apparatus to satisfy the following two conditions: first, the detection does not rely on signatures to get rid of the signature database, and second, the detection method must have a high correct rate.

SUMMARY OF THE INVENTION

The present invention has been made to overcome the aforementioned drawback of conventional detection methods that use rule/signature. The primary object of the present invention is to provide a detection method of malicious codes, applicable to a computer system. The computer system includes one or more hosts, each host executes at least an application program, and each application program includes one or more processes. The detection method comprises the steps of: (a) intercepting all the system calls and related arguments from all the processes by a pre-installed system call monitor module on each host; (b) extracting pre-defined system calls from all the intercepted system calls by malicious code analysis module; (c) determining whether the intercepted pre-defined system calls, arguments, and input dataflow being suspicious of including malicious code; if not, returning to step (a); (d) executing suspicious malicious code and generating the behavior prediction of the suspicious malicious code; (e) comparing the predicted behavior with the actual behavior of the execution of the suspicious malicious code; if different, returning to step (a); and (f) issuing a warning of intrusion.

Another object of the present invention is to provide an architecture of the detection method, including at least a system call monitor module and a malicious code analysis module.

The system call monitor module is pre-installed on each host to intercept and output all the system calls and related arguments from one or more processes. The malicious code analysis module receives all the system calls and related arguments from the system call monitor module, and determines whether a warning should be issued after analysis and comparison.

The present invention does not rely on the signature, and instead, uses a system call interposition technology, which is an operation system kernel mode program to intercept, modify or interrupt all the system calls from the processes. Based on the received input data and behavior during the processes, the system call interposition technology determines whether an attack is detected; therefore, does not rely on the signature commonly used in conventional technology. The present invention can detect both known and unknown attack techniques, and has a high correct rate and low incorrect ruling without the rule comparison. The present invention is applicable to heap/stack overflow, format string attack, integer overflow, and other attacks.

The foregoing and other objects, features, aspects and advantages of the present invention will become better understood from a careful reading of a detailed description provided herein below with appropriate reference to the accompanying drawings.

DETAILED DESCRIPTION OF THE PREFERRED EMBODIMENTS

An application program is attacked as a result of accepting the data from a malicious code. In other words, a part of the input data to the application program is from the malicious code so that the application program behaves abnormally. Although an application program has many types of data input channels, they are not complicated from the system point of view. The following lists the data input channels that may be under at attack:

I. When intruder and the victim processes are not on the same host:

The victim process relies on the network to read data. The most commonly used channels are the receiving system calls (such as recv( )) or reading system calls (such as read( )) of the socket interface.

II. When the intruder and victim processes are on the same host:

The possible data input channels for the victim process include command line arguments, environment variables, file access, pipe and inter-process communication. The command line arguments and environment variables are passed through the execution of system calls, such as execve( ), while file access and pipe passes data through read system calls. The inter-process communication is seldom exploited by the malicious code, and therefore is not considered in the present invention.

Accordingly, it can be seen that an application program mainly uses the following channels for data input: receiving, reading and executing system calls. These channels include normal data flow, and possibly the malicious code data. Therefore, it is only necessary to monitor the data flow of these system calls, instead of all the system calls.

Figure 1:
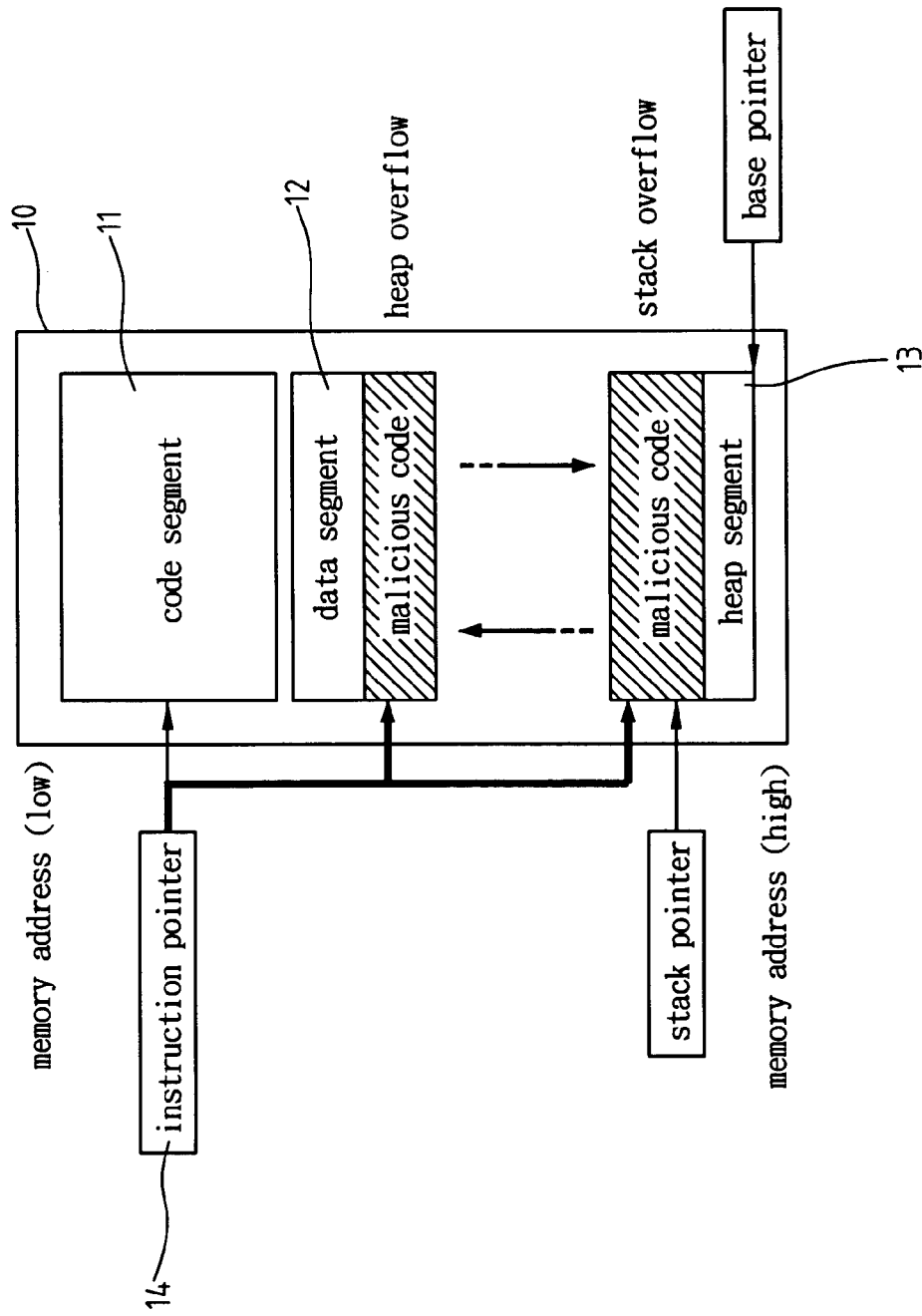
FIG. 1 shows a schematic view of a conventional memory structure.
Figure 2:
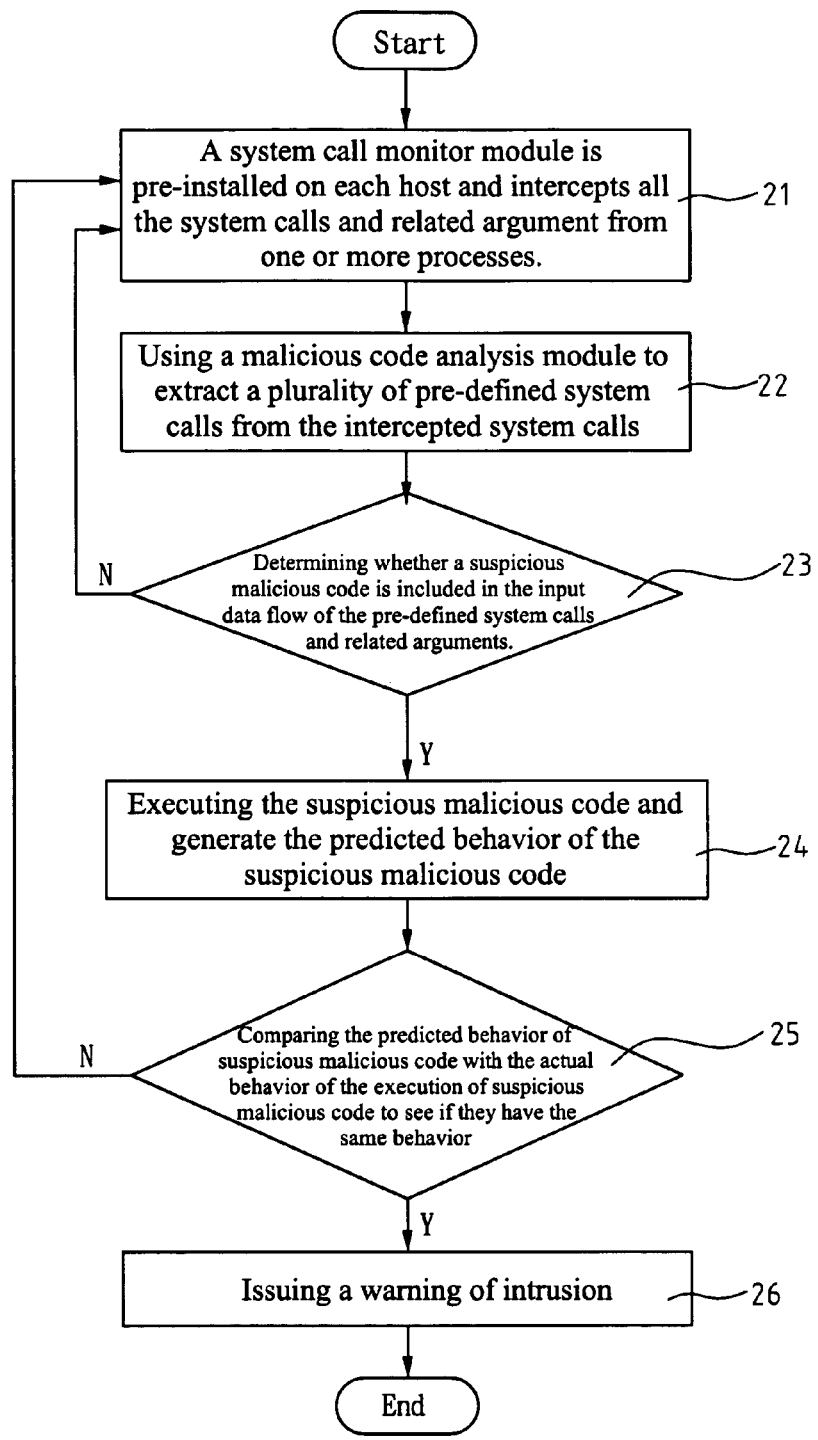
FIG. 2 shows a flowchart of the detection method of malicious code according to the present invention.
Figure 3:
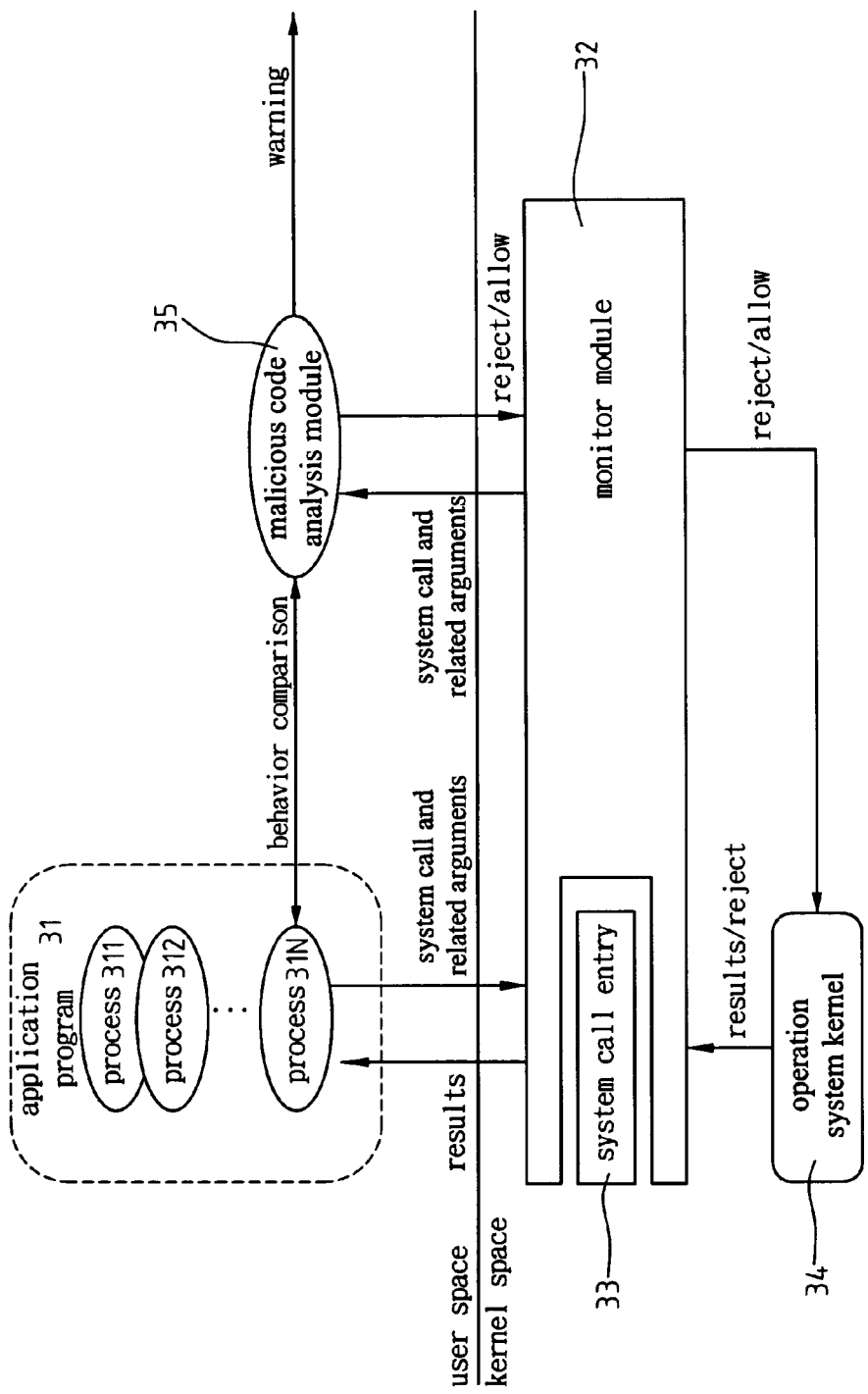
FIG. 3 shows a block diagram of the present invention applicable to a host.

FIG. 2 is a flowchart illustrating a detection method of malicious code according to the present invention. FIG. 3 shows a block diagram of the present invention. The following description refers to both FIG. 2 and FIG. 3.

The present invention is applicable to a computer system, including one or more hosts, each host executing at least an application program, and each application program having one or more processes. The detection method of malicious code comprises the following steps. In step 21, a system call monitor module 32 is pre-installed on each host and intercepts all the system calls and related argument from one or more processes. System call monitor module 32 is configured to monitor application program 31 and processes 311-31N in the operation system. As shown in FIG. 3, system call monitor module 32 uses the system call interposition technology, which is an operation system kernel mode program, to intercept, modify or interrupt all the system calls sent by processes 311-31N to system call entry 33. It also intercepts the results from the operation system kernel 34 to system call entry 33.

In step 22, malicious code analysis module 35 extracts a plurality of pre-defined system calls from the intercepted system calls. Malicious code analysis module 35 (described in more details in FIG. 4 and FIG. 7B) reads the original messages sent by system call monitor module 32 and extracts a plurality of pre-defined system calls. The original messages include the name of the process, the system calls made by the process, the argument of the system call, and the return value of the system call, and so on. The pre-defined system calls are related to input data, such as receiving, reading and executing process system calls. Another pre-defined system call is spawning system call, such as fork( ). This system call is to fork an identical child process, which will be executed concurrently with the parent process. This is usually how the concurrent programming is implemented.

Step 23 is to determine whether a suspicious malicious code is included in the input data flow of the pre-defined system calls and related arguments. If so, proceed to step 24; otherwise, return to step 21.

The malicious code uses the system call to accomplish its intended behavior. For example, a malicious code can use an executing system call to execute a file or upgrade the authority of the process, such as setuid( ). In an operation system, the system call is executed through the software interrupt INT, and the system call ID is passed through a register and the first argument is passed through another register.

For example, in Intel x86 series, the opcode of software interrupt INT is \xcd\x80. Therefore, when the data flow of the pre-defined receiving, reading and executing system calls includes the \xcd\x80, it implies that there may be a malicious code and further identification is required. The identification is performed by observing whether the registers, such as EAX, are accessed. Because the registers must be set before the system calls for the operation system kernel to know the identification of the system calls, the access to the register, such as EAX, is an indication of a suspicious malicious code. The most common access to the register is "move eax", whose opcode is \xb0, followed by a 32-bit value. For example, the call to upgrade the authority system call, such as setuid( ), is:

| Instruction | Opcode (hexadecimal) |
|---|---|
| mov 17 h, EAX | b017 |
| ... | ... |
| int 80 h | cd80 |

The system calls found in the data flow are the system calls made by the suspicious malicious codes. Step 24 is to execute the suspicious malicious code and generate the predicted behavior of the suspicious malicious code.

Figure 5:
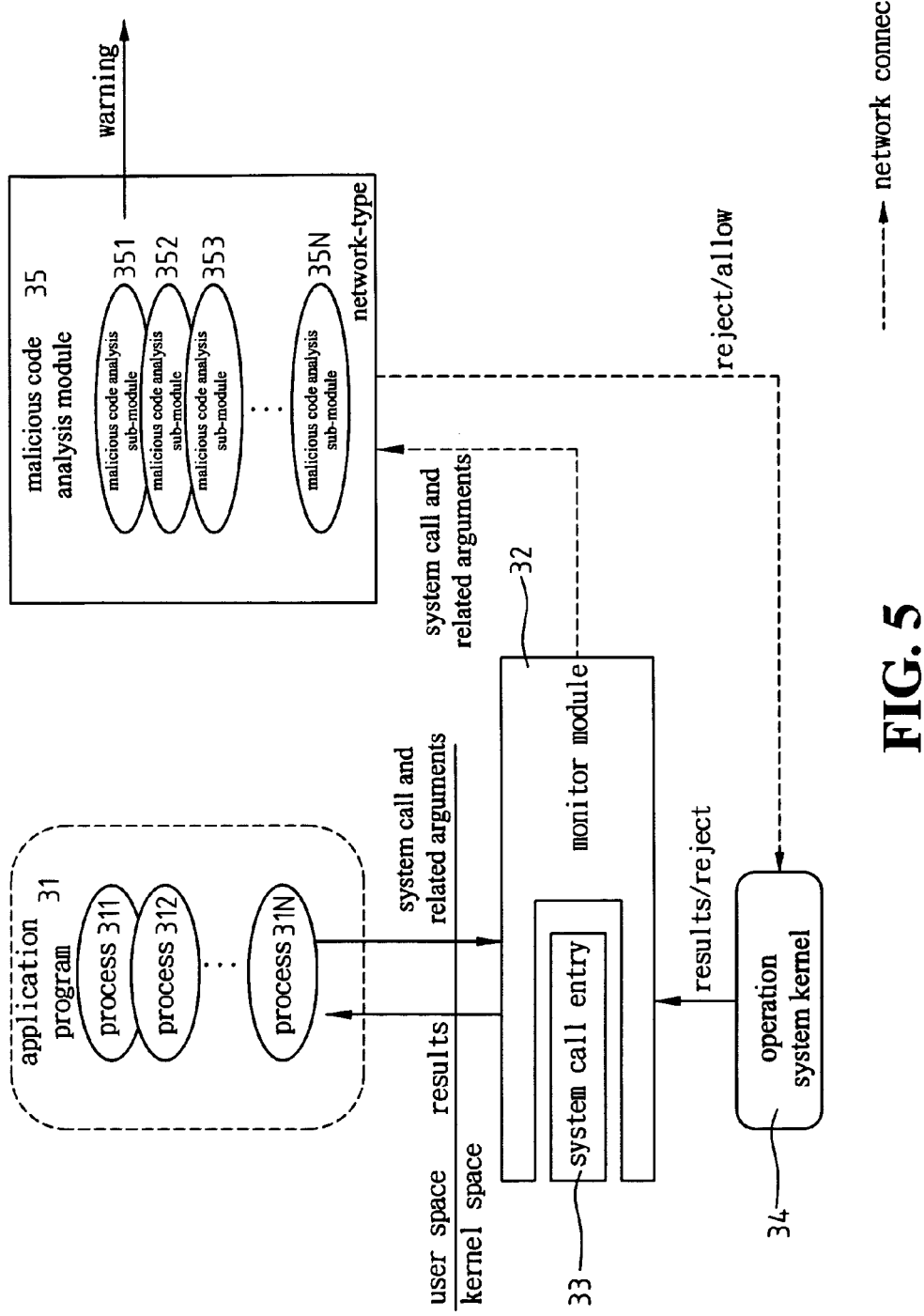
FIG. 5 shows a block diagram of the present invention applicable to a network system.

FIG. 5 shows the data flow through the malicious code analysis module according to the present invention. Malicious code analysis module 35 extracts a plurality of pre-defined system calls 44 from all the system calls and related arguments intercepted by system call monitor module 32, and identifies whether suspicious malicious code appears in the data flow of the pre-defined system calls and related arguments; if so, suspicious malicious code 43 is outputted.

Figure 4:
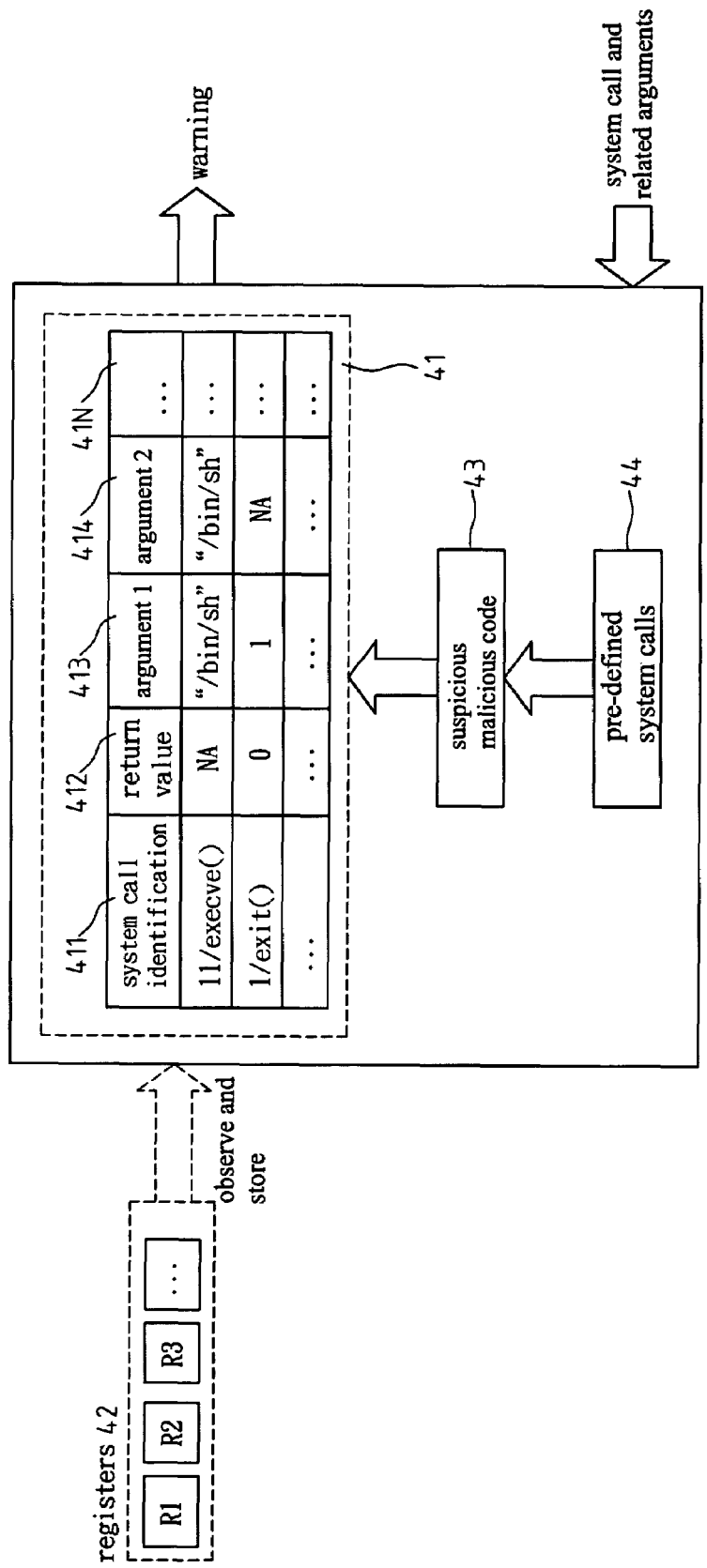
FIG. 4 shows a block diagram of the malicious code analysis module of FIG. 2.

According to the present invention, malicious code analysis module 35 maintains malicious code predicted behavior table 41 for each process. As shown in FIG. 4, malicious code analysis module 35 executes suspicious malicious code 43, observes the contents of important registers 42 before and after the system calls, and stores the system call identification, related argument and the return value of system calls to the identification field 411, argument fields 413-41N, and return value field 412 of malicious code predicted behavior table 41. In addition, if malicious code analysis module observes a fork system call, the malicious code predicted behavior table 41 of the parent process is copied and passed to the child process. This is because both parent process and child process have the same variables and code. The only difference is the return value. Therefore, the parent process and child process have the same predicted behavior before the fork system call, which is why predicted behavior table 41 of the parent process must be passed to the child process.

Step 25 is to compare the predicted behavior of suspicious malicious code 43 with the actual behavior of the execution of suspicious malicious code. If both show the same behavior, proceed to step 26; otherwise, return to step 21. Malicious code analysis module 35 continues to observe the suspicious malicious code in system call order, system call argument and the state of the registers (actual behavior) to determine whether it matches the system call order, system call argument and the state of registers (predicted behavior) in predicted behavior table 41.

Step 26 is to issue a warning of intrusion. When the actual behavior of a suspicious malicious code matches the predicted behavior of a malicious code, malicious code analysis module 35 issues a warning of intrusion to the host so that the host can take necessary protective actions to prevent further damages.

As aforementioned, system call monitor module 32 must be pre-installed on each host that requires the detection. On the other hand, malicious code analysis module 35 can be categorized, based on the installation, into three different structures: host, network and embedded system.

FIG. 3 shows an installation of malicious code analysis module 35 in the same host with application program 31 and system call monitor module 32. Malicious code analysis module 35 only performs the detection of attack targeting the local host. The advantage is that this can detect intrusion which is undetectable by the network-type IDS.

FIG. 5 shows an installation that malicious code analysis module 35 is on a host different from application program 31. In this embodiment, different malicious code analysis sub-modules 351-35N can perform the detection of attacks targeting different hosts in the network. A single network-type malicious code analysis module 35 can perform detection of specific attacks targeting different hosts in the network to alleviate the load of the host operation system.

Figure 6:
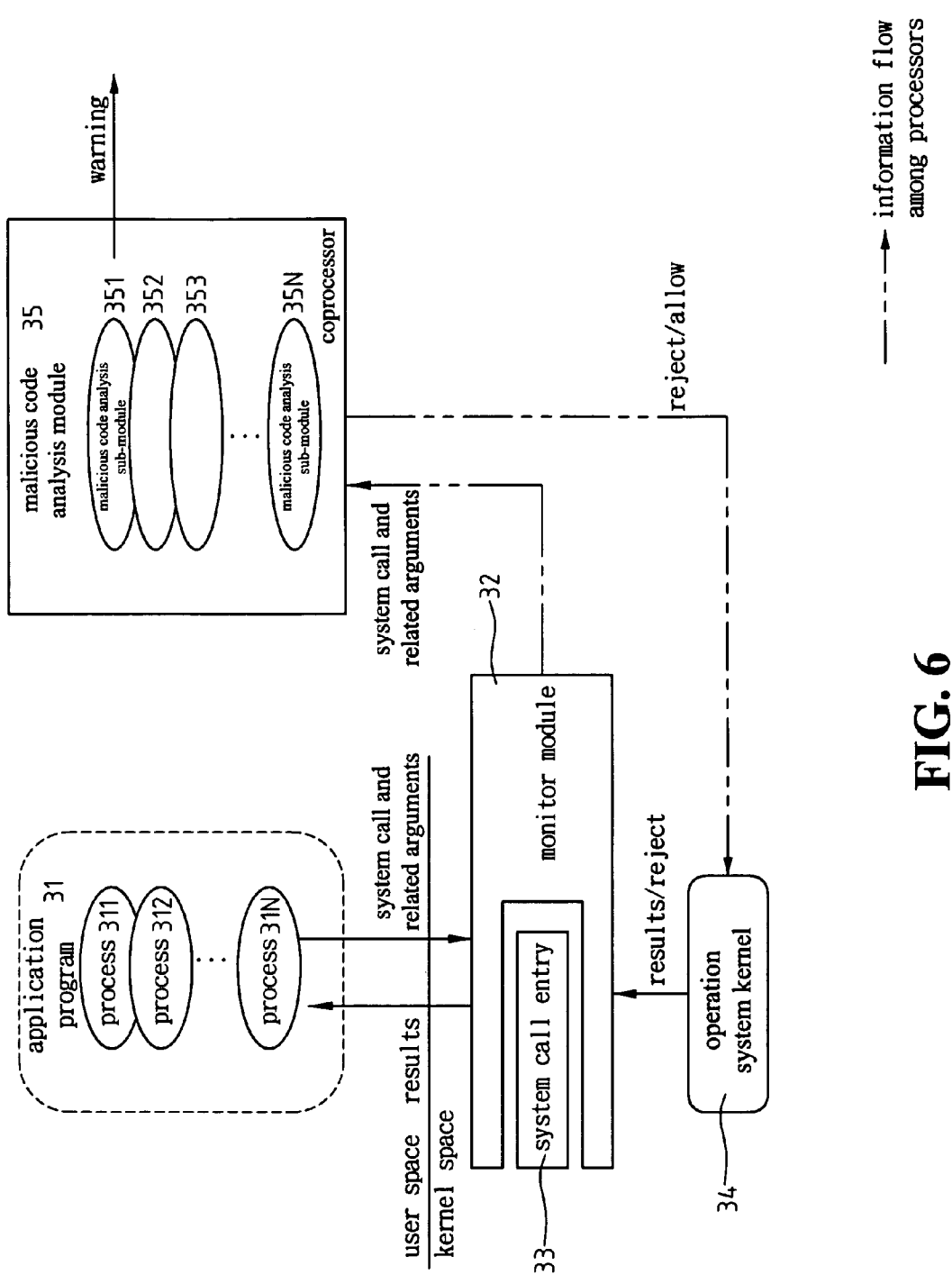
FIG. 6 shows a block diagram of the present invention applicable to an embedded system.

FIG. 6 shows an installation of the malicious code analysis module in an embedded system. In this embodiment, malicious code analysis module 35 is independent of the host executing application program 31, and is realized as an embedded system or a co-processor system. The different malicious code analysis sub-modules 351-35N can perform the detection of attacks targeting different hosts in the network. Independent embedded system type malicious code analysis module 35 can perform detection of specific attacks targeting different hosts in the network to alleviate the load of the host operation system at a lower hardware cost.

Figure 7A:
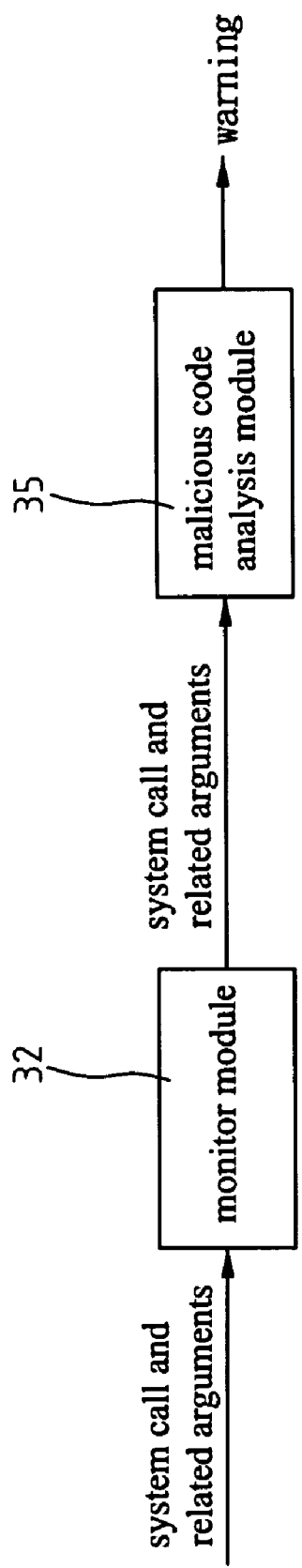
FIG. 7A shows a schematic view of the hardware architecture according to the present invention.

FIG. 7A shows a schematic view of the hardware implementation of the detection method of the present invention. The architecture is applicable to a computer system, including at least a host, each host executing at least an application program, and each application program at least including a process.

As shown in FIG. 7A, the architecture comprises at least a system call monitor module 32 and a malicious code analysis module 35. System call monitor module 32 is pre-installed on each host to intercept and output all the system calls and related argument of one or more processes. Malicious code analysis module 35 receives all the system calls and related arguments, and determines whether to issue a warning of intrusion after analysis and comparison.

Figure 7B:
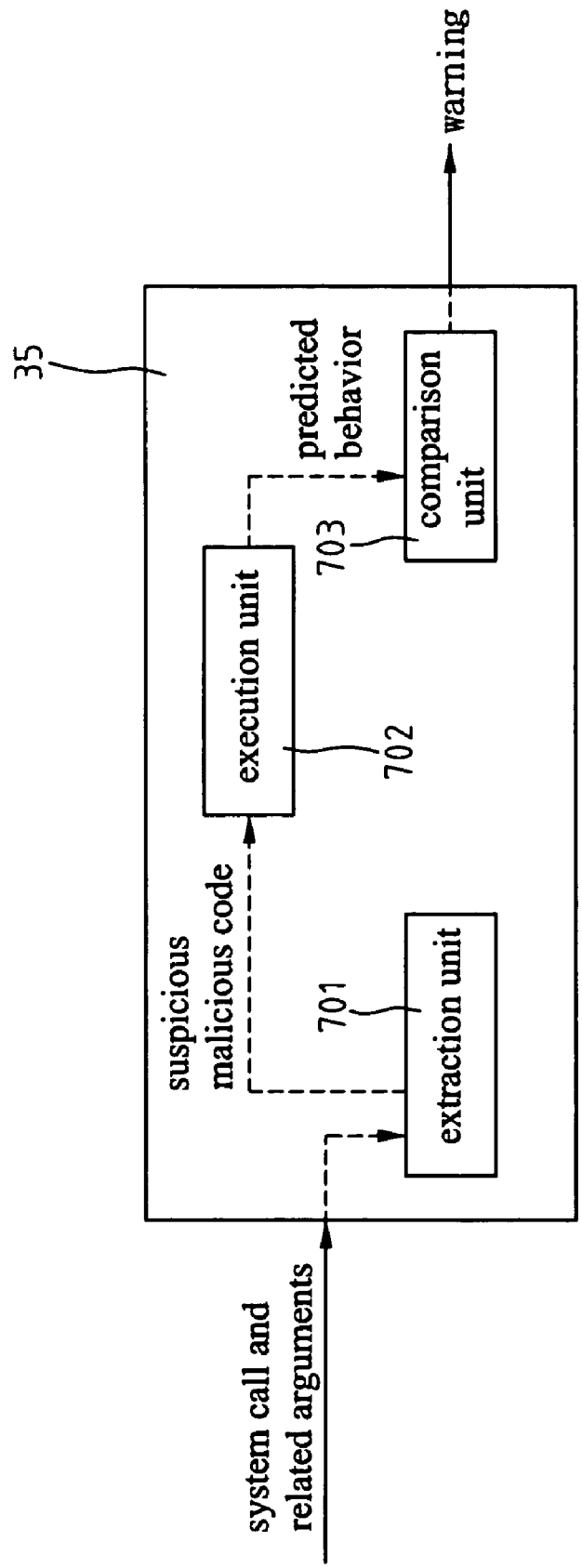
FIG. 7B shows a schematic view of the architecture of the malicious code analysis module according to the present invention.

FIG. 7B shows a schematic view of the structure of the malicious code analysis module. Refer to FIG. 4 and FIG. 7B, malicious code analysis module 35 includes an extraction unit 701, an execution unit 702, and a comparison unit 703. Extraction unit 701 extracts a plurality of pre-defined system calls 44 from the intercepted system calls and related arguments, searches and outputs suspicious malicious code 43. Execution unit 702 receives and executes the suspicious code and generates the predicted behavior of the suspicious malicious code. Comparison unit 703 compares the system call order, system call argument and the state of the registers (actual behavior) of the suspicious malicious code with the system call order, system call argument and the state of registers (predicted behavior) in predicted behavior table 41 to determine whether to issue a warning of intrusion.

It is worth noticing that extraction unit 701, execution unit 702, and comparison unit 703 in FIG. 7B can all be realized in a malicious code analysis sub-module 351-35N.

The present invention uses a malicious code analysis module to execute suspicious malicious code and compares the behavior of the execution with a predicted behavior of a malicious code to determine whether an intrusion is detected. The present invention does not rely on signature of attacks commonly used in conventional IDS; therefore, the present invention is not required to maintain a large signature database. In addition, the present invention provides a high correct detection rate, low incorrect ruling, and is able to detect both known and unknown attacks.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A detection method of malicious codes, applicable to a computer system, said computer system having at least a host, each said host executing at least an application program, and each said application program comprising at least a process; said method comprising the steps of:
   (a) intercepting all system calls and related arguments from all said processes by a pre-installed system call monitor module on each said host;
   (b) extracting a plurality of pre-defined system calls from all the intercepted system calls by a malicious code analysis module;
   (c) determining whether the intercepted pre-defined system calls, arguments, and input data flow include a suspicious malicious code; if not, returning to step (a);
   (d) executing said suspicious malicious code and generating predicted behavior of said suspicious malicious code;
   (e) comparing said predicted behavior with actual execution behavior of said suspicious malicious code; if different, returning to step (a); and
   (f) issuing a warning of intrusion.

2. The method as claimed in claim 1, wherein said pre-defined system calls in said step (b) are system calls related to data input.

3. The method as claimed in claim 2, wherein said pre-defined system calls in said step (b) include a reading system call, a receiving system call and an executing system call.

4. The method as claimed in claim 1, wherein said pre-defined system calls in said step (b) are a fork system call, said fork system call spawns an identical child process from a calling process.

5. The method as claimed in claim 4, wherein said step (d) is followed by a step of copying predicted behavior of said calling process to said child process.

6. The method as claimed in claim 1, wherein said step (c) uses a malicious code analysis module to execute said suspicious malicious code.

7. The method as claimed in claim 6, wherein said malicious code analysis module is used in an embedded system.

8. The method as claimed in claim 1, wherein said related arguments of said pre-defined system calls in said step (c) at least comprise command line arguments and environment variables.

9. The method as claimed in claim 1, wherein said step (d) is executed on the same host as said process.

10. The method as claimed in claim 1, wherein said step (d) and said process is executed on a different processor or component.

11. The method as claimed in claim 1, wherein said computer system is an independent network facility for executing virtual machine.

12. The method as claimed in claim 1, wherein said step (e) at least comprises comparison of register states of said predicted behavior and said actual execution behavior of said suspicious malicious code.

13. The method as claimed in claim 1, wherein said step (e) at least comprises comparison of system call order of said predicted behavior and said actual execution behavior of said suspicious malicious code.

14. The method as claimed in claim 1, wherein said step (e) at least comprises comparison of system call arguments of said predicted behavior and said actual execution behavior of said suspicious malicious code.

15. An architecture for detecting malicious codes, applicable to a computer system, said computer system comprising at least a host, each said host executing at least an application program, and each said application program comprising at least a process; said architecture comprising:
   at least a system call monitor module pre-installed on each said host to intercept and output all system calls and related argument of one or more said processes; and
   a malicious code analysis module for receiving all said intercepted system calls and related arguments, and determining whether to issue a warning of intrusion after analysis and comparison;
   wherein said malicious code analysis module further comprises:
   an extraction unit for extracting a plurality of pre-defined system calls from said intercepted system calls and related arguments, searching and outputting a suspicious malicious code;
   an execution unit for receiving and executing said suspicious malicious code and generating predicted behavior of said suspicious malicious code; and
   a comparison unit for comparing said predicted behavior with actual execution behavior of said suspicious malicious code to determine whether to issue a warning of intrusion.

16. The architecture as claimed in claim 15, wherein said pre-defined system calls are system calls related to data input.

17. The architecture as claimed in claim 15, wherein said malicious code analysis module is installed on a coprocessor independent of the main processor of said host.

18. The architecture as claimed in claim 15, wherein said malicious code analysis module is installed on the same host as said system call monitor module.

19. The architecture as claimed in claim 15, wherein said computer system is a network system, and said malicious code analysis module is installed on a host different from said system call monitor module.

* * * * *